(12) United States Patent
Kerler et al.

(10) Patent No.: US 8,495,894 B2
(45) Date of Patent: Jul. 30, 2013

(54) HEAT EXCHANGER IN PARTICULAR WITH COLD RESERVOIR

(75) Inventors: Boris Kerler, Stuttgart (DE); Michael Kohl, Bietigheim (DE); Sebastian Grossmann, Möglingen (DE); Emil Neumann, Stuttgart (DE); Wolfgang Seewald, Stuttgart (DE)

(73) Assignee: Behr GmbH & Co., KG, Stuttgart (DE)

( * ) Notice: Subject to any disclaimer, the term of this patent is extended or adjusted under 35 U.S.C. 154(b) by 1112 days.

(21) Appl. No.: 12/278,748

(22) PCT Filed: Feb. 6, 2007

(86) PCT No.: PCT/EP2007/001016
§ 371 (c)(1),
(2), (4) Date: Sep. 8, 2008

(87) PCT Pub. No.: WO2007/090615
PCT Pub. Date: Aug. 16, 2007

(65) Prior Publication Data
US 2009/0095015 A1    Apr. 16, 2009

(30) Foreign Application Priority Data

Feb. 10, 2006 (DE) .......................... 10 2006 006 444
Jun. 14, 2006 (DE) .......................... 10 2006 028 017

(51) Int. Cl.
*F25D 19/00*    (2006.01)
*F28D 7/10*    (2006.01)

(52) U.S. Cl.
USPC .................. 62/406; 165/10; 165/140; 62/515

(58) Field of Classification Search
USPC ....................... 62/515, 406; 165/176, 140, 10
See application file for complete search history.

(56) References Cited

U.S. PATENT DOCUMENTS

| 1,018,711 | A | * | 2/1912 | Kibby | ........................... 165/299 |
| 2,382,255 | A | * | 8/1945 | Pyzel | ........................... 165/140 |
| 2,819,592 | A | * | 1/1958 | Smith | ............................. 62/278 |
| 3,587,732 | A | * | 6/1971 | Burne | ........................... 165/158 |

(Continued)

FOREIGN PATENT DOCUMENTS

| DE | 101 56 944 A1 | 7/2002 |
| DE | 102 27 585 A1 | 1/2004 |

(Continued)

OTHER PUBLICATIONS

Office Action mailed Feb. 28, 2012 in related Japanese application No. 2008-553670 (7 pgs.).

*Primary Examiner* — Judy Swann
*Assistant Examiner* — Alexis Cox
(74) *Attorney, Agent, or Firm* — Foley & Lardner LLP

(57) ABSTRACT

The invention relates to a heat exchanger, in particular, an evaporator (1), in particular for a motor vehicle air-conditioner, with a number of closely arranged refrigerant tubes and at least one cold reservoir (4), in which a refrigerant medium is provided. The evaporator (1) comprises two parallel regions (1' and 1") running across the total width, the first region (V) corresponding to a conventional evaporator in design, the cold reservoir (4) being arranged in a separate second region (1"), through which at least a partial flow of refrigerant can flow which also flows through at least a part of the first region (1') and the first and the second region are connected to each other by at least one overflow opening (13).

26 Claims, 15 Drawing Sheets

U.S. PATENT DOCUMENTS

Figure 1:
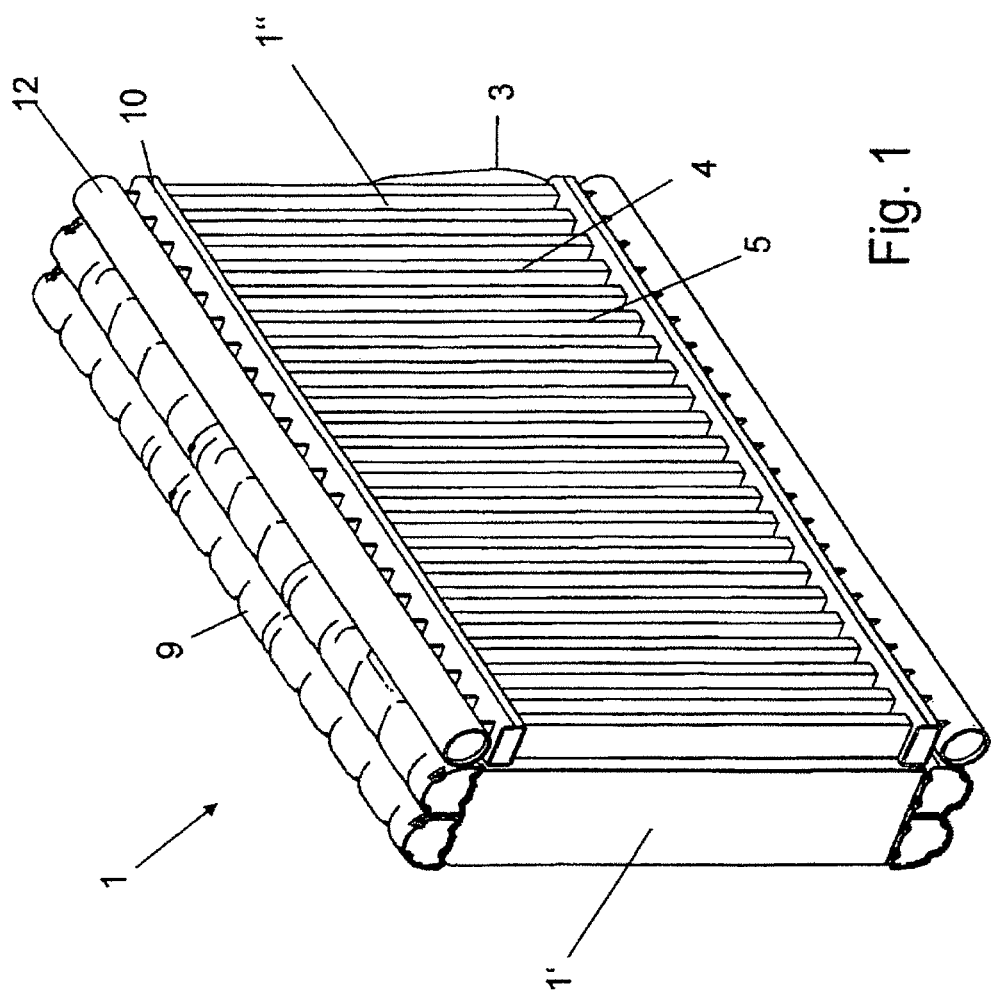

| | | | |
|---|---|---|---|
| 4,250,958 A * | 2/1981 | Wasserman | 165/46 |
| 4,738,303 A * | 4/1988 | Lampe et al. | 165/10 |
| 5,644,929 A * | 7/1997 | Tanaka et al. | 62/406 |
| 6,386,277 B1 * | 5/2002 | Wattelet et al. | 165/164 |
| 6,568,205 B2 * | 5/2003 | Bureau et al. | 62/515 |
| 6,691,527 B2 | 2/2004 | Bureau et al. | |
| 6,854,286 B2 | 2/2005 | Bureau et al. | |
| 7,156,156 B2 | 1/2007 | Haller et al. | |
| 8,122,943 B2 | 2/2012 | Haller et al. | |
| 8,191,615 B2 * | 6/2012 | So et al. | 165/140 |
| 2003/0041610 A1 | 3/2003 | Shirota et al. | |
| 2004/0093889 A1 | 5/2004 | Bureau et al. | |
| 2004/0104020 A1 | 6/2004 | Haller et al. | |
| 2004/0194933 A1 | 10/2004 | Ikeda | |
| 2005/0166632 A1 * | 8/2005 | Bureau et al. | 62/515 |
| 2007/0039714 A1 | 2/2007 | Loup et al. | |
| 2007/0068650 A1 | 3/2007 | Haller et al. | |
| 2010/0000707 A1 * | 1/2010 | Tsubone et al. | 165/10 |
| 2010/0116474 A1 * | 5/2010 | Kerler et al. | 165/148 |
| 2012/0204595 A1 * | 8/2012 | Tamaki et al. | 62/498 |

FOREIGN PATENT DOCUMENTS

| | | |
|---|---|---|
| DE | 102 47 265 A1 | 4/2004 |
| EP | 1 424 531 A2 | 6/2004 |
| FR | 2 861 166 A1 | 4/2005 |
| JP | 61059188 A | 3/1986 |
| JP | 61202084 A | 9/1986 |
| JP | 2002274165 A | 9/2002 |
| JP | 2002337537 A | 11/2002 |
| JP | 2003063239 A | 3/2003 |
| JP | 2003090689 A | 3/2003 |
| JP | 2005532525 A | 10/2005 |
| JP | 2009526194 A | 7/2009 |

* cited by examiner

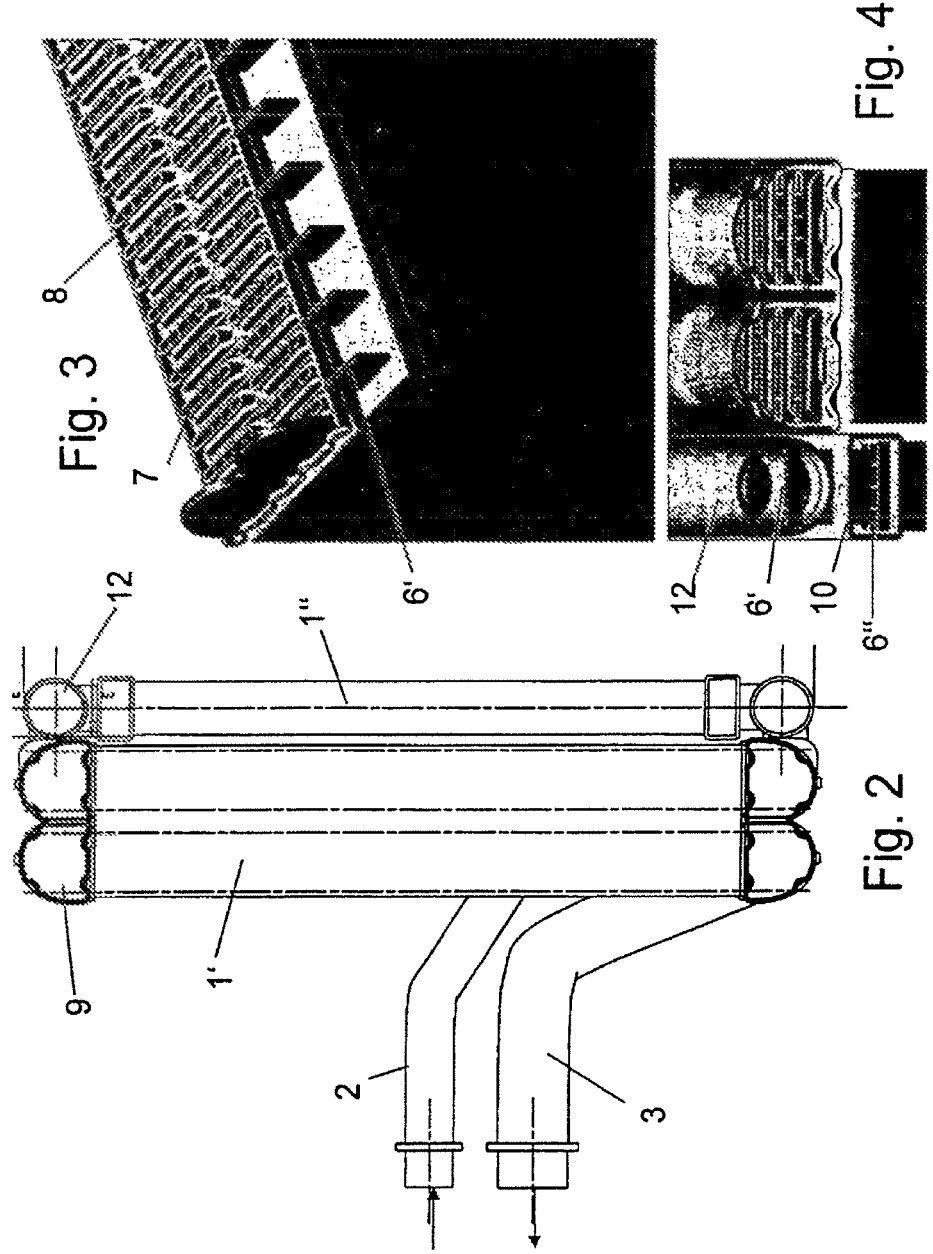

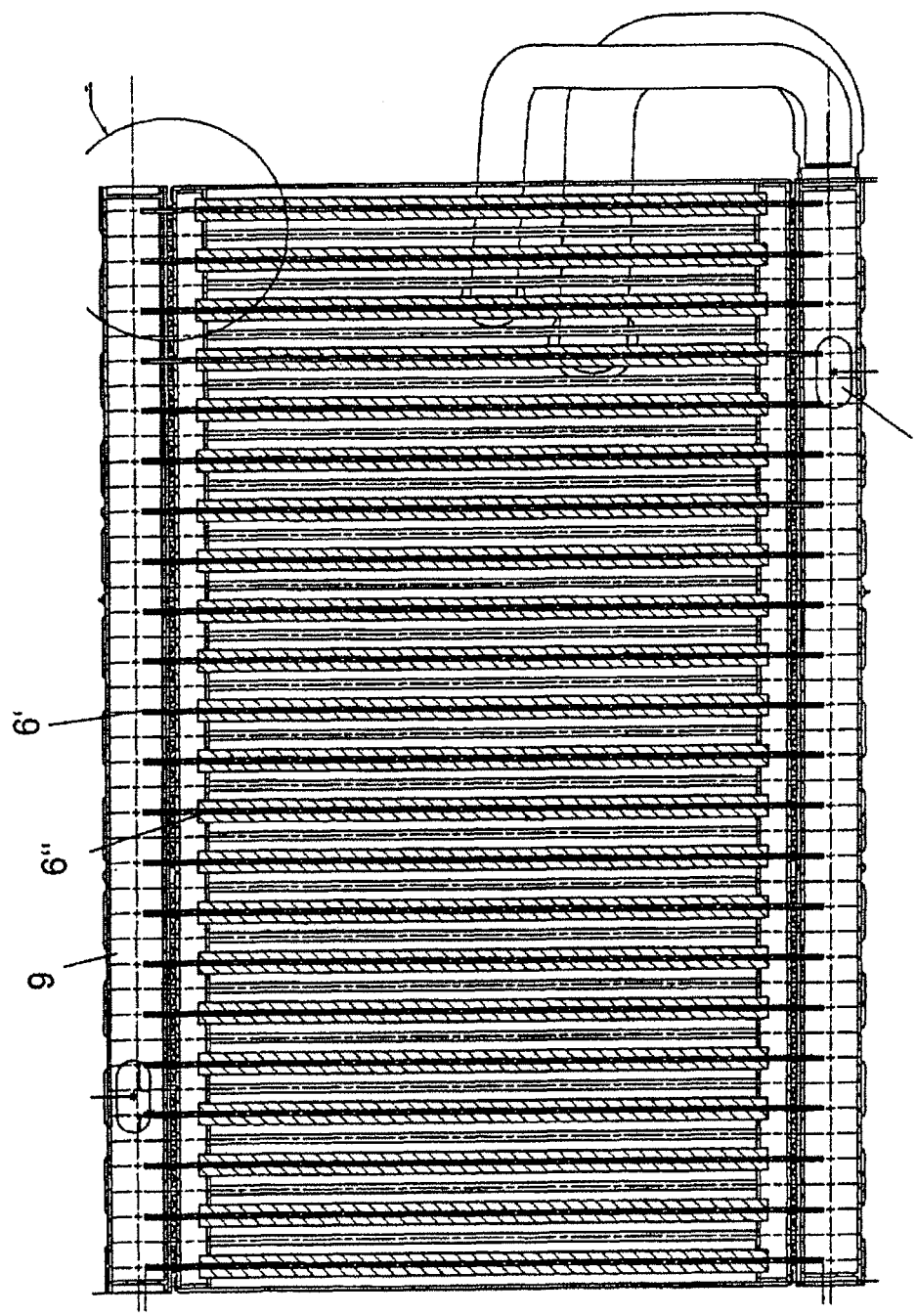

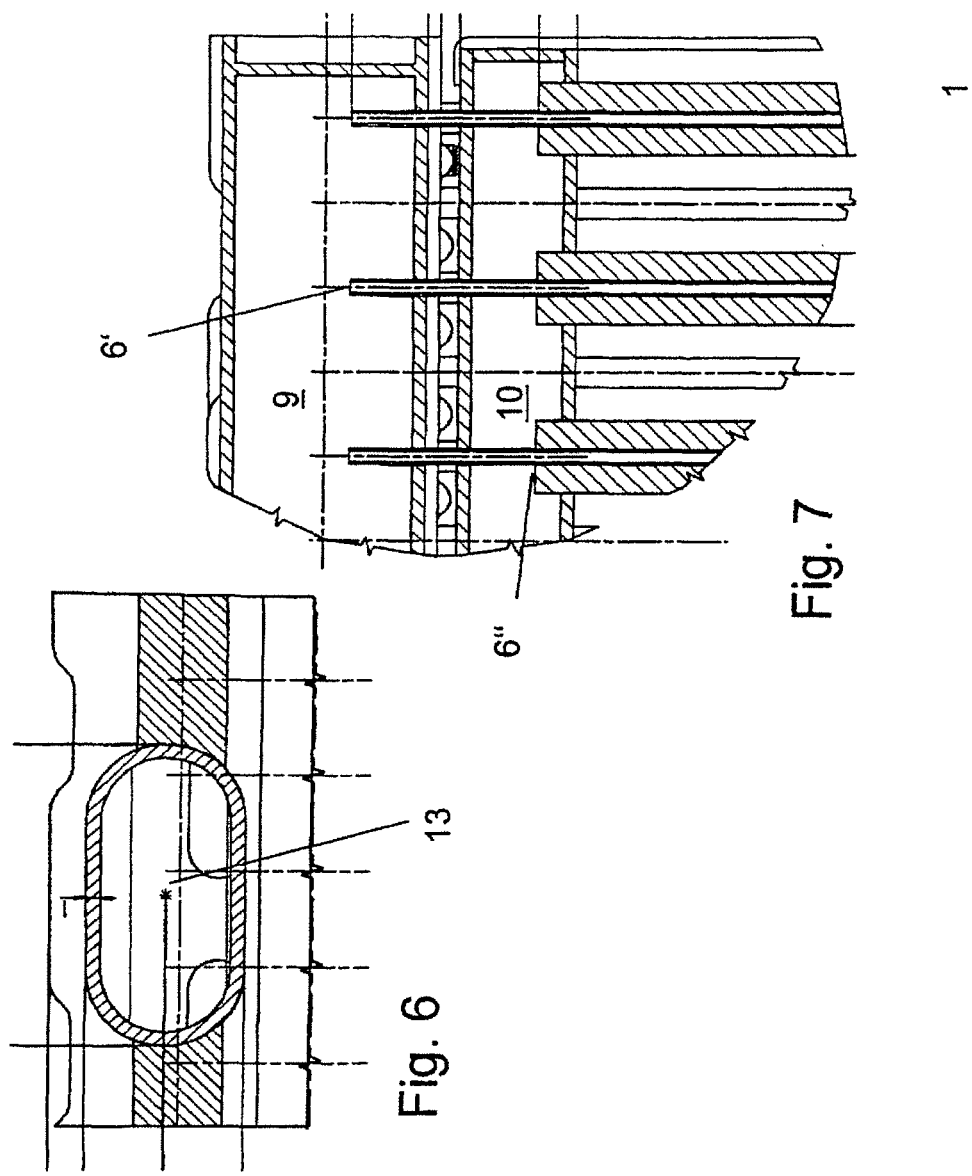

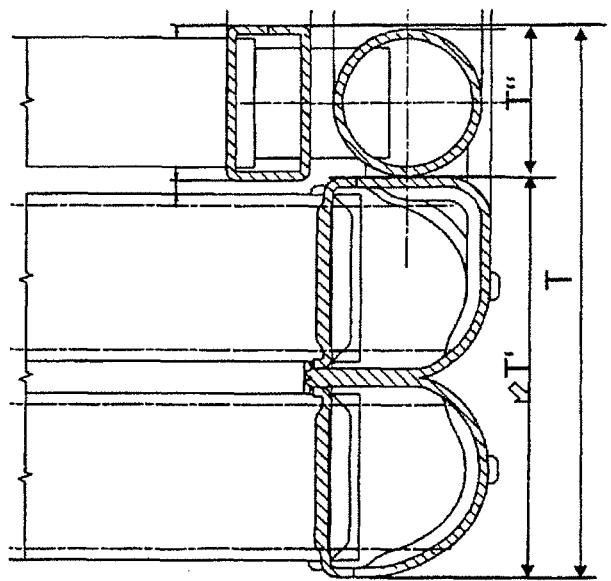
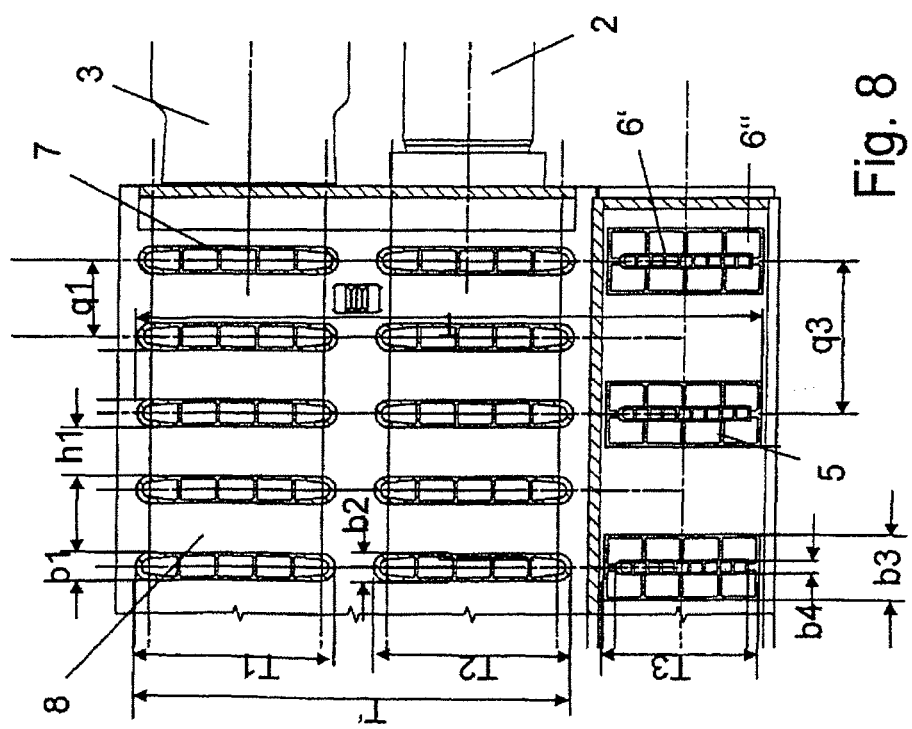

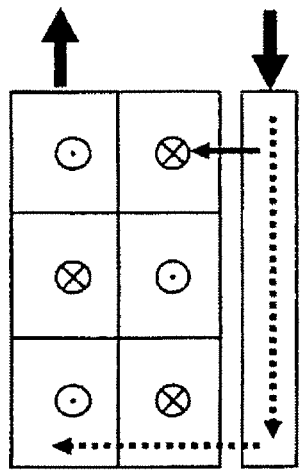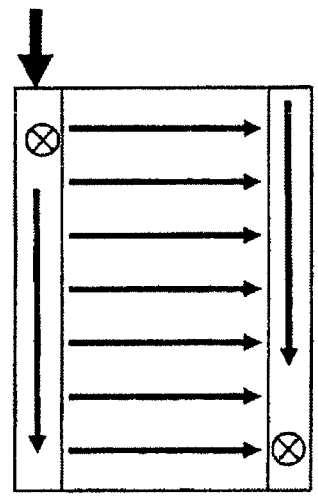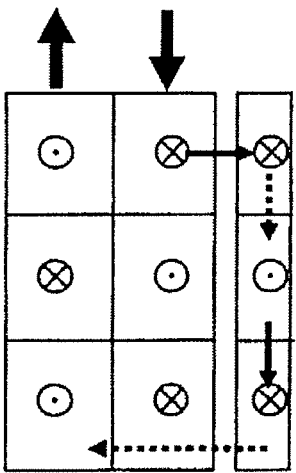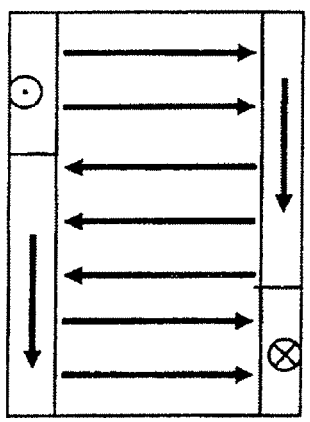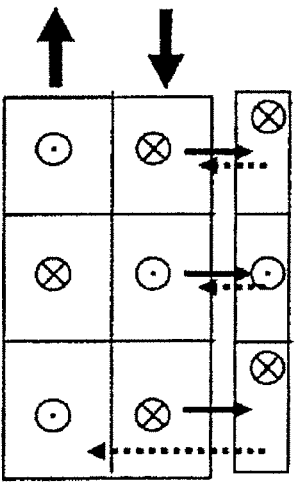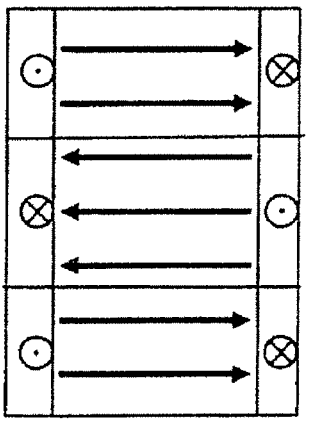

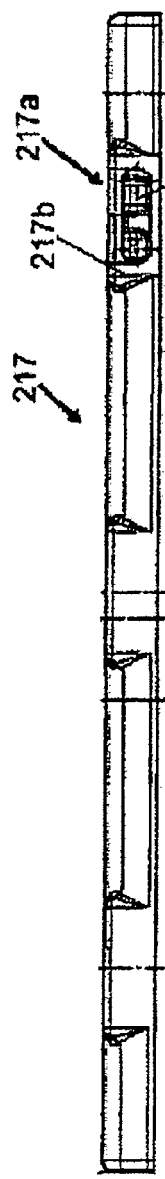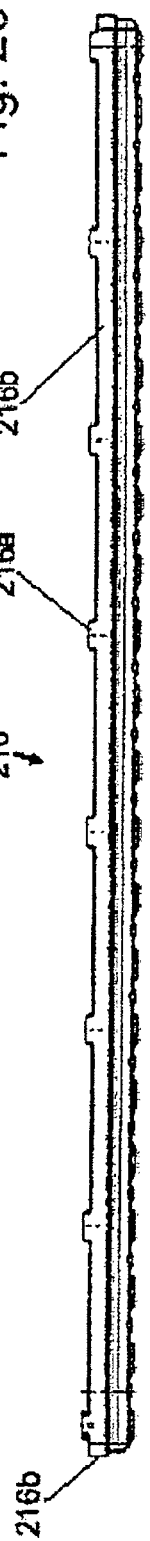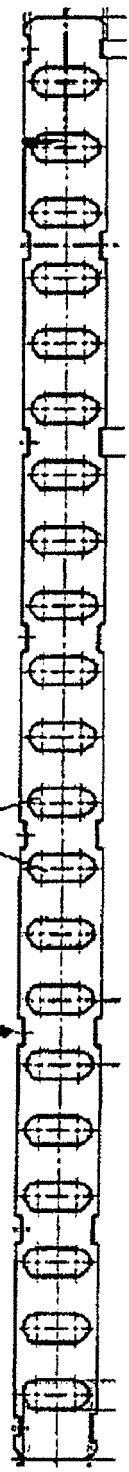

HEAT EXCHANGER IN PARTICULAR WITH COLD RESERVOIR

The invention relates to a heat exchanger, for a motor vehicle air conditioning system, with a cold store. The invention also relates to a heat exchanger for use in an air conditioning system.

It is an aim of the motor vehicle manufacturers to reduce the fuel consumption of the vehicle. One measure for reducing the fuel consumption is to cut off the engine when the vehicle is temporarily stationary, for example when stopping at traffic lights. This temporary cutoff of the engine is also referred to as idle-stop operation. In modern low-consumption vehicles, such as, for example, in the so-called three-liter vehicle, this measure is already being used. In vehicles boasting the idle-stop operating mode, the engine is cut off for about 25-30% of the journey time in inner-city traffic.

This is a reason why such vehicles are often not equipped with an air conditioning system, for when the engine is shut down, nor can a compressor necessary for an air conditioning system be driven, so that in idle-stop operation an air conditioning system cannot provide the necessary cold capacity. The problem is also partially solved by the fact that, when the air conditioning system is switched on, the engine continues running during a stop, whereby, however, a higher fuel consumption is obtained.

In DE 101 56 944 A1 there is disclosed an air conditioning system for a motor vehicle, having a compressor and an evaporator, disposed in a refrigerant circuit, for the cooling of air to be conditioned for the interior, which air conditioning system has a second evaporator for air cooling purposes which additionally contains a cold storage medium, the air to be conditioned optionally being able to be passed through each evaporator individually or through both evaporators jointly. According to an alternative embodiment, instead of the second evaporator, the evaporator is configured such that it has two subregions and in one of the two subregions contains a cold storage medium, the air to be conditioned optionally being able to be passed through each evaporator individually or through both evaporators jointly. The tubes in which the refrigerant flows through the evaporator can here be configured as multichannel tubes, one or more of the channels being filled with the cold storage medium.

Starting from this prior art, the object of the invention is to provide an improved heat exchanger. This object is achieved by a heat exchanger of the embodiments described herein.

According to the invention, a heat exchanger, in particular an evaporator for a motor vehicle air conditioning system for the cooling of air to be conditioned for the interior is provided, having a plurality of mutually adjacent, refrigerant-carrying tubes and having at least one cold store, in which a cold storage medium is provided. The evaporator here has two mutually parallel regions extending over the entire width, wherein the first region corresponds in its structure to a conventional evaporator, the cold store is disposed in an independent second region, which can be flowed through by at least a part of the refrigerant flow which also flows through at least a part of the first region, and the first and the second region are connected to each other by at least one overflow opening. Via the overflow opening, at least a partial flow of refrigerant flows over from one region into the other region, i.e. refrigerant flows in both regions. Between the tubes of the first and/or of the second region of the heat exchanger there are disposed corrugated ribs, or other elements which enlarge the heat transfer surface. The fact that the first region substantially corresponds to that of a conventional heat exchanger means that existing tools can continue to be used, only the tools for the second region and for the creation of the overflow opening(s) must be newly procured. The second region—if the first region is designed in accordance with the previous construction—is relatively easily adaptable to the existing installation space and the cooling requirement. Furthermore, only one expansion member is necessary.

Because of the modular structure, an evaporator which is configured in this way can also be referred to as an "add-on" storage evaporator, i.e. to the, in principle, substantially conventional basic form of the evaporator is added a correspondingly configured cooling module.

In one preferred embodiment, the first and the second region extend over the entire width, thereby providing a high capacity in a compact design. Alternatively, it is also possible for one of the regions to extend over only a part of the entire width, which can be desirable depending on the available installation space or else depending on the desired distribution of the cold capacity of the conventional evaporator and store evaporator.

Preferably, precisely two overflow openings are provided, though—in the case of a separate refrigerant feed—just one overflow opening may also be provided. Similarly, a plurality of overflow openings are possible, through which refrigerant can flow over from the first region to the second region and vice versa.

In at least one cold storage element there is preferably disposed at least one refrigerant-carrying tube. The cold storage elements can here be connected to one another, in particular by at least one reservoir.

In one arrangement of the refrigerant-carrying tube in the cold storage element, it can be plugged into the cold storage element filled with the cold storage medium or else can be configured directly therein, the cold storage medium preferably surrounding the refrigerant from all sides and, in particular, a tube-in-tube arrangement being provided.

Likewise, the cold storage element can be formed by a tube of U-shaped cross section, in particular having a plurality of chambers. In this case, the internal dimensions of the cold storage element preferably correspond to the external dimensions of the refrigerant-carrying tube in the corresponding region, so that the tubes bear full-facedly one against the other. A one-piece embodiment, for example formed by a correspondingly extruded tube having at least two channels, is also possible.

In the case of an arrangement fully within the cold storage element, the tube which carries the refrigerant and contains the cold storage medium is preferably configured as a double-walled flat tube, the refrigerant being located in the central region and the cold storage medium in the outer region. According to a further preferred embodiment, the double-walled flat tube has webs, which connect the outer to the inner flat tube. The fact that the cold store has direct air contact produces very good dynamics in the heat transfer, so that, where necessary, i.e. in idle-stop operation, the full cold capacity is immediately available.

The tube containing the cold storage medium may also not fully surround the refrigerant-carrying tube. In this case, preferably, precisely three sides of the refrigerant-carrying tube are surrounded by the tube containing the cold storage medium. The tube containing the cold storage medium can here be configured with a U-shaped cross section and can surround the refrigerant-carrying tube, preferably a flat tube, partially, i.e. over a part of its periphery, the greatest part of the refrigerant-carrying tube preferably being disposed inside the tube containing the cold storage medium.

Preferably, the refrigerant-carrying tubes of the second region end in a reservoir, which is configured separate from and only by one or more overflow openings to a reservoir of the first region. This allows the heat exchanger, where appropriate, also to be retrofitted with a cold store, in particular the first regions—apart from the overflow openings—can however be identically configured, as in the case of conventional heat exchangers, so that the manufacturing costs, as a result of larger batch sizes and same tools for a large part of the component parts, are able to be lowered. Furthermore, the two regions can be put together separately and then connected to each other.

The tubes or channels carrying cold storage medium preferably end in a cold storage medium reservoir, through which the refrigerant-carrying tubes or channels project, which end in a separate reservoir. This allows the individual cold storage elements to be jointly filled with the cold storage medium, so that a simple and rapid filling of the tubes or channels carrying the cold storage medium is possible. Furthermore, the assembly can be simplified by the preferably one-piece design of the cold store in the case of a separate configuration of the refrigerant-carrying tubes and of the cold storage elements. A compensating space for, in particular, temperature-induced changes in volume of the refrigerant can thereby also be provided. Furthermore, this allows a compact design of the second region.

Preferably, the first region has, in the direction of its width adjacent to the second region, a number of blocks which can be flowed through in different direction by the refrigerant, and the second region has at least one block, in particular a number of blocks which can be flowed through in different direction by the refrigerant. Here, the number and/or width of the individual blocks in the latitudinal direction of the evaporator preferably differs in the first region and in the second region. The first region preferably has directly adjacent to the second region two to four, in particular three blocks, and the second region has one to six blocks, in particular one to three blocks.

Preferably, flat tube rows of the first region and of the second region are mutually aligned, a flat tube of the second region also being able to be disposed, however, only behind every nth, in particular every second or third flat tube, of the first region, so that the air flow resistance is as low as possible, though the flat tube rows may also be disposed in irregular or offset arrangement (for example, centrally staggered), or the cold storage elements with the refrigerant-carrying tubes disposed therein may be arranged wryly relative to the other flat tubes of the evaporator. The number and shape of the flat tubes of the second region can be chosen in accordance with the desired heat quantity in the case of a vehicle stop.

The second region of the evaporator is preferably disposed, viewed in the normal air flow direction, after the first region of the evaporator, in particular directly following the evaporator, but an arrangement before the evaporator or somewhat remote from the evaporator is also possible in a second, in particular smaller evaporator part. Particularly in the case of a remote arrangement from the (main) evaporator, the size of the collector with cold store can be adapted in accordance with the existing installation space and/or the requirements. It is particularly advantageous that the existing evaporator does not have to be modified, or only very slightly, so that a relatively simple integration of the cold store into existing systems is possible. Existing tools do not have to be modified (or only very slightly). Only the tools for the cold storage region of the evaporator which is added on have to be procured.

The tubes which are flowed through by the refrigerant are preferably constituted by welded or folded flat tubes, or flat tubes which are deep-drawn or extruded from blanks and can be configured both rounded and square. Oval tubes or round tubes can also however be used. As materials, in particular aluminum and aluminum alloys can enter into consideration, but the use of other suitable, good heat-conducting materials of choice is also possible.

The cold store preferably consists of aluminum, in particular internally and/or externally coated aluminum (aluminum also being understood as an aluminum alloy), where appropriate also copper, a copper-zinc alloy, synthetic resin or plastic. An aluminum reservoir has the advantage that it can be soldered together with the other parts of the evaporator without difficulty. Preferably it is in the form of an extruded flat tube having a plurality of channels, one part of the channels containing the cold storage medium and the other part of the channels containing the refrigerant. The design may also, however, be multipart.

The latent or storage medium is preferably constituted by a PCM material (phase change material), which preferably contains or is formed from congruently melting media, in particular decanol, tetra-, penta- or hexadecane, $LiClO_3 3H_2O$, aqueous salt solutions or organic hydrates. In the storage medium nucleating agents can also be provided, which accelerate the crystallization.

The phase change temperature of the storage medium lies preferably within a range from 0° C. to 30° C., preferably from 1° C. to 20° C., in particular from 2° C. to 15° C., in particular preferably from 4° C. to 12° C.

Inside the cold storage element—irrespective of whether it wholly or only partially surrounds the refrigerant-carrying tube—inlays such as ribbed sheet-metal plates, preferably of aluminum, though other metals or plastics are also suitable, or other turbulence inlays such as nonwovens or knitted fabrics, for example of plastic or metal, or foams, for example metal foams or plastic foams, can be provided. The inlays serve to improve the heat transport and to increase the inner surface in order to accelerate the crystallization of the storage medium.

The two regions are preferably flowed through in series or parallel, so that only one expansion member is provided for both regions. The refrigerant inlet is here preferably provided on the collector of the first region. In this context, parallel can also mean that one of the partial flows is small in relation to the other, in particular that the proportion through the second region is small in relation to the proportion through the first region.

Preferably, the heat exchanger has the following dimensions (with respect to the measurements, reference is made to FIGS. 8 and 9):

The total depth T of the heat exchanger is preferably 23 to 200 mm, in particular 35 to 80 mm, particularly preferably 60+/−10 mm. 35 to 100 mm is also conceivable.

The installation depth T' is preferably 20 to 150 mm, in particular 25 to 90 mm. The installation depths T1 and T2 of the flat tubes of the evaporator in the region without cold store are generally mutually corresponding (symmetrical shaping of this evaporator region). The installation depth of the store element T" can be 5 to 100 mm, preferably 10 to 40 mm.

As regards the height H and the width B, advantageous values for H and B are 50 to 500 mm, in particular 100 to 300 mm for H and 100 to 350 mm for B.

The widths b1 and b2 of the flat tubes of the evaporator in the region without cold store are preferably mutually corresponding, a flat tube of one row preferably being respectively aligned with a flat tube of the other row. The widths b1 and b2 are preferably 0.8 to 4 mm, in particular 1.3 to 3.5 mm, particularly preferably 1.0 to 3.2 mm.

The transverse spacing q1 of the first flat tube row is preferably 4 to 20 mm, particularly preferably 5 to 13 mm. It preferably corresponds to the transverse spacing of the second flat tube row of the evaporator.

The height of the corrugated rib of the first flat tube row is thus preferably 3 to 18 mm, in particular 4 to 10 mm. It preferably corresponds to the corrugated rib height of the second flat tube row of the evaporator.

The evaporator, in the region of the cold store, has flat tubes, which contain the cold storage medium in the outer cold storage medium channels, having widths b3 from preferably 2.0 to 10.0 mm, in particular from 3.0 to 8.0 mm. The width b4 of the flat tubes disposed therein, in whose refrigerant channels the refrigerant flows, is preferably 0.6 to 2.5 mm, in particular 0.9 to 1.5 mm. Also conceivable, however, are 0.6 to 2.5 mm, in particular 0.9 to 2 mm.

The installation depth T3 of the flat tubes of the evaporator in the region with cold store is preferably 5 to 70 mm, particularly preferably 10 to 30 mm. The range from 8 to 20 mm, in particular 10 to 13 mm can prove to be advantageous. For the outer dimensions of the tubes which contain the latent storage medium and in which are advantageously disposed flat tubes through which refrigerant flows, an installation depth of 7 to 80 mm, preferably from 10 to 26 mm, particularly preferably from 12 to 16 mm, have proven to be favorable.

The transverse spacing q3 of the flat tubes of the evaporator in the region with cold store is preferably a multiple of q1, in order to keep the pressure decrease of the through-flowing air low, but may also correspond to q1. Particularly preferred values are two and three. Typical values of q3 are conventionally 4 to 30 mm, in particular 9 to 22 mm. The corrugated rib height can advantageously be selected to be from 2 to 20 mm, in particular from 4 to 10 mm.

The height H1 of the cold storage medium reservoir is preferably 3 to 25 mm, in particular 3 to 15 mm, but is preferably as small as possible in order to save installation space and keep the cross section through which air can flow as large as possible. 5 to 40 mm, in particular 10 to 20 mm can also prove to be particularly advantageous in this context.

In a further preferred embodiment, a first reservoir for the refrigerant and an adjacent second reservoir for the cold storage medium are formed substantially from at least one sheet-metal molded part, thereby facilitating cost-effective series production. Here, the first reservoir and the second reservoir are particularly preferably formed substantially from three sheet-metal molded parts, comprising a base part, an intermediate part and a cover part. This permits both simple production of the individual sheet-metal parts and a readily controllable combination of the sheet-metal parts to form the two reservoirs, for example by means of simultaneous soldering of the assembled molded parts in a soldering furnace in a manner known per se. For this purpose, at least one of the three sheet-metal molded parts is formed as a substantially trough-shaped part with an encircling edge which is turned up in particular in the region of an end side. This not only permits simple pre-assembly and reliable soldering, but also saves on additional parts such as for example an end-side closure cover.

The term "sheet-metal molded part" should fundamentally be broadly interpreted here. In addition to classic metal sheets composed of a metallic material, said term also encompasses in particular molded parts whose thickness is small in relation to their other dimensions.

For the purpose of cost-effective production, at least one of the three sheet-metal molded parts is formed as a deep-drawn part, thereby permitting complex shaping in particular when using aluminum and/or aluminum alloys as a sheet-metal material.

In one advantageous refinement, at least one of the three sheet-metal molded parts has a lug for the clamped retention of one of the other sheet-metal molded parts. Said clamped retention facilitates pre-assembly before common soldering in a soldering furnace, and reduces a defect rate in the soldering process.

In one advantageous detail design, an upper plate plane of a lower reservoir of the second region and an upper plate plane of a lower reservoir of the first region run at substantially the same height. In this way, accumulated condensed water of the first region can flow off via the second region and vice versa, such that a water outflow of the heat exchanger can be arranged in a flexible fashion.

In order to provide a sufficient volume for the cold storage medium even in the event of the outer dimensions of the heat exchanger being limited, it is advantageously possible for a structural height of a collector region of the second region to be greater than a structural height of a reservoir of the first region.

In one particularly preferred embodiment, in the second region, an upper collector region and a lower collector region are provided with in each case one first reservoir for the refrigerant and one adjacent second reservoir for the cold storage medium, with the upper collector region and the lower collector region being connected by means of a plurality of tubes, with at least one of the tubes having at least one first channel for conducting the refrigerant and at least one second channel, which is separated by a partition, for conducting the cold storage medium. Here, a major part of an exchange of heat between the refrigerant and the storage medium takes place via the partition, with the first channels simultaneously having the function of conventional evaporator channels as the refrigerant flows through. In this way, a compact design with a high heat-exchanging capacity is provided overall.

Here, in one simple-to-produce variant, one of the channels is formed as an outer tube and the other one of the channels is formed as an inner tube which is inserted into the outer tube, thereby simultaneously providing a large partition surface. In this version of tubes which are plugged one into the other, in order to avoid vibrations and to enlarge contact regions with good thermal conductivity, means are expediently formed on at least one of the two tubes, the outer tube or the inner tube, for the radial guidance of the other tube in each case. Alternatively, it is also possible for the inner tube and the outer tube to be formed as a single-piece extruded profile. As a further alternative, the tubes or channels can also be arranged adjacent to one another and not one inside the other.

In one expedient detail design of the channels which are arranged one inside the other, the inner tube is the first channel for conducting the refrigerant and the outer tube is the second channel for conducting the cold storage medium. Firstly, the refrigerant channel usually has a smaller overall cross section, and secondly, it is usually desirable for the cold storage medium to be in good heat-exchanging contact with the air flowing around the outer tube, in order to ensure that the stored cold is provided quickly when the compressor is stopped.

In the interests of a solution which is small in terms of construction, one of the channels projects at the end side beyond the other channel, with the projecting channel extending entirely through one of the reservoirs. The shorter tube therefore ends in a simple manner only in the first reservoir, with the longer tube extending through said reservoir in a sealed fashion and ending in the adjacent second reservoir.

In one preferred embodiment, at least one of the channels is formed as an extruded profile, thereby enabling complex shaping of the channel, for example with a plurality of separate chambers and/or integrally formed means for radially supporting the other channel, in a cost-effective manner.

In a further advantageous detail design, a collector region of the second region has at least one substantially planar section which is soldered areally to a corresponding substantially planar section of a collector region of the first region. In this way, the second region can be fastened in a simple and secure manner to the first region, in particular during the course of a complete soldering of the pre-assembled heat exchanger in a soldering furnace. Furthermore, the first and the second regions can be provided as separate modules without the procurement or assembly of further fixing means, which makes the production of heat exchangers with and without a cold store more efficient overall. The planar sections which are soldered to one another particularly expediently have an aperture to form the overflow opening so that the areal soldering serves simultaneously for mechanical retention and for creating the overflow opening. Here, the aperture can be provided in the planar region according to the design and nesting of the fluid paths in the individual series. For example, it is thus always possible for a plurality of planar sections to be provided and soldered for mechanical retention, but with only some of the planar sections being provided with apertures to produce a coolant passage.

In one advantageous detail design, the substantially planar section is formed in the manner of a jutty out of a wall of the collector region. This permits defined contact and good areal soldering of the adjacent collector regions to one another. Furthermore, a connecting surface for the areal soldering of the planar sections is particularly preferably drawn out of a surface of the jutty. Even in the case of given tolerances and a slight contraction of the components, it is possible in this way to obtain reliable areal soldering, for example in combination with suitable clamping or pressing of the parts before treatment in a soldering furnace.

For a general heat exchanger, in particular for a motor vehicle, in particular, for use in an air conditioning system, the object of the invention is achieved by the features of the embodiments described herein. The formation of the adjacent reservoir by means of one or more sheet-metal molded parts permits cost-effective production with particularly little expenditure. The construction of such regions from sheet-metal molded parts. that is to say metal sheets shaped by means of deep-drawing and/or punching and/or similar methods, is expedient and can be combined effectively with soldering in a soldering furnace. In this way, it is possible to substantially or entirely dispense with complex machining steps such as cutting shaping of the collector regions. The term "sheet-metal molded part" should fundamentally be broadly interpreted in this context too, as already mentioned.

In one preferred refinement, the first reservoir and the second reservoir are formed overall substantially from three sheet-metal molded parts, comprising a base part, an intermediate part and a cover part. It is fundamentally possible for two adjacent reservoirs to also be constructed from only one or from two or else from more than three molded parts, with the construction from three molded parts having proven to be a good compromise in practice. Here, it should be taken into consideration that both an increasing number of separate and more simply-shaped parts is disadvantageous because the defect rate in production increases as a result of the increasing number of solder points. In contrast, when using fewer than three molded parts to produce the two reservoirs, the shaping of the sheet-metal molded parts or their subsequent machining has proven to be relatively complex.

It is particularly preferable for at least one of the three sheet-metal molded parts to be formed as a substantially trough-shaped part with an encircling edge which is turned up in particular in the region of an end side. In this way, it is possible to obtain reliable and areal soldering at one side of the edge, with it being possible to dispense with additional closure parts, such as for example end-side covers, as a result of the encircling edge. At least one of the three sheet-metal molded parts is advantageously formed as a deep-drawn part, wherein for example a trough-shaped part can be expediently produced by means of deep-drawing.

It is also preferable for at least one of the three sheet-metal molded parts to have a lug for the clamped retention of one of the other sheet-metal molded parts, thereby improving pre-assembly before placement into a soldering furnace.

In one advantageous embodiment, the heat exchanger can comprise an inner heat exchanger of a motor vehicle air conditioning system, in particular an inner heat exchanger of a $CO_2$ air conditioning system, with the first and the second fluids being $CO_2$ from different regions of a refrigerant circuit. The specific requirements of an inner heat exchanger of $CO_2$ air conditioning systems can be met in a cost-effective fashion by means of such a design.

Figure 10:
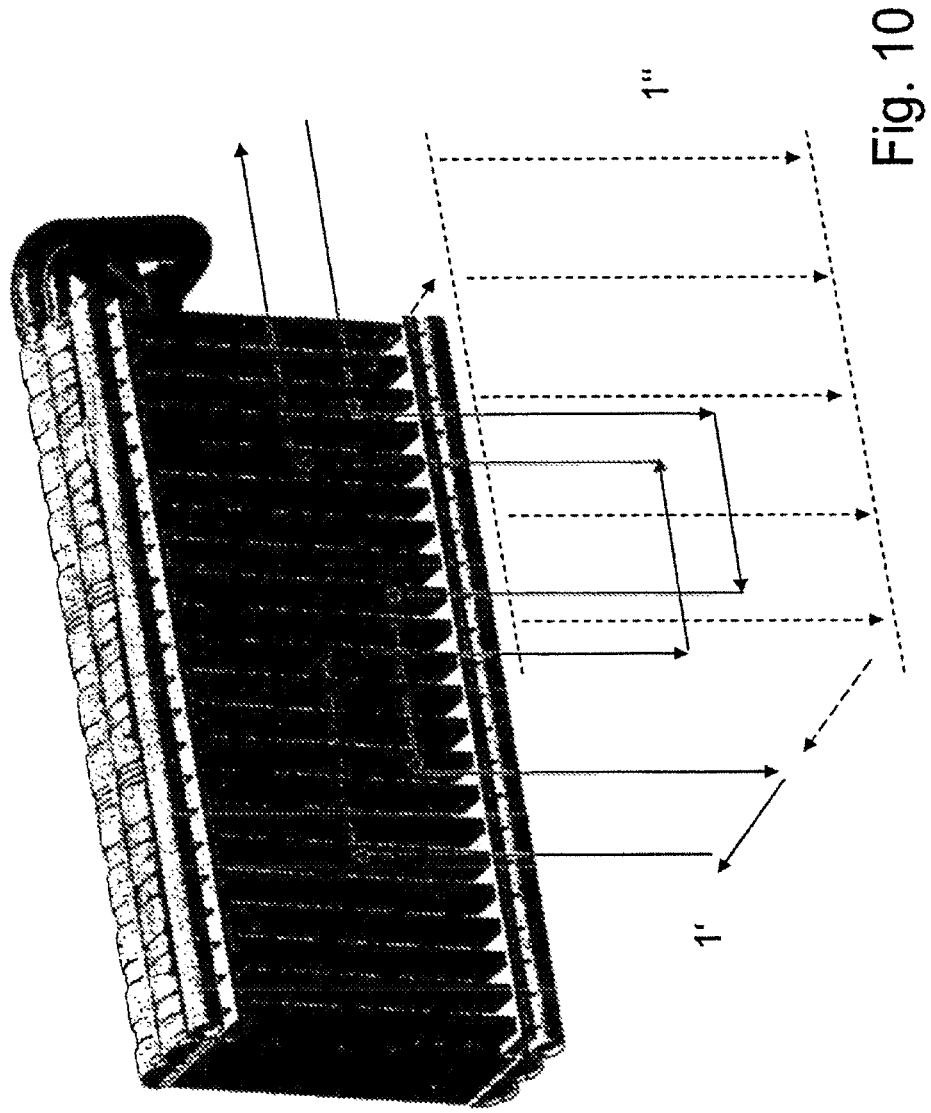
Figure 11:
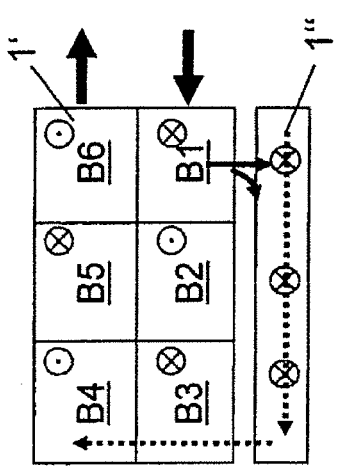
Figure 12:
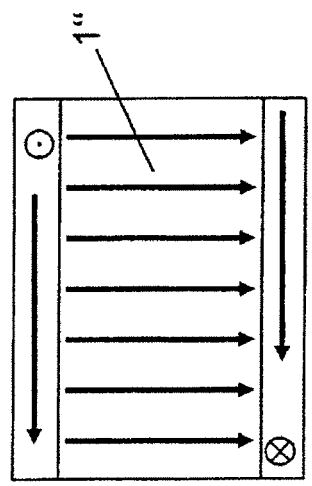
Figure 18A:
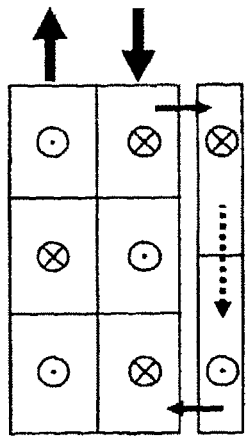
Figure 17A:
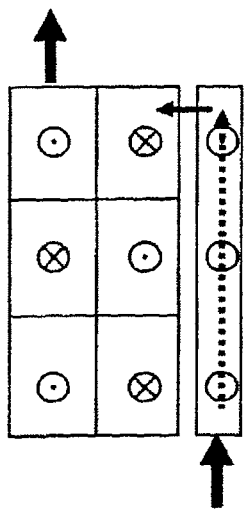
Figure 16A:
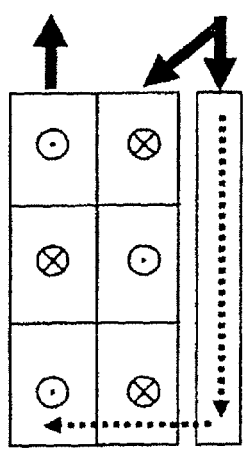

The invention is explained in detail below with reference to two illustrative embodiments with variants, partially with reference to the drawing, wherein:

FIG. 1 shows a perspective view of a heat exchanger with collector according to the first illustrative embodiment, FIG. 2 shows a side view of the heat exchanger of FIG. 1, FIG. 3 shows a sectional perspective view of the heat exchanger of FIG. 1, with removed collecting box and collecting tube, FIG. 4 shows a further perspective view of a region of the heat exchanger of FIG. 1, with laterally opened reservoir and collecting tube, FIG. 5 shows a sectioned side view of the heat exchanger of FIG. 1, FIG. 6 shows a detailed view of an overflow opening, FIG. 7 shows a sectioned detailed view of the heat exchanger of FIG. 1 in the region of the cold store, FIG. 8 shows a section transversely through the heat exchanger of FIG. 1, FIG. 9 shows a section through the lower region of the heat exchanger of FIG. 1, FIG. 10 shows a perspective view of the heat exchanger of FIG. 1, with schematic representation of the refrigerant flow path, FIG. 11 shows a schematic sectional representation of the heat exchanger of FIG. 1, in illustration of the refrigerant flow path, FIG. 12 shows a schematic side view of the heat exchanger region with the cold store of FIG. 1, in illustration of the refrigerant flow path, FIGS. 13a, b show schematic representations of the refrigerant flow path according to a first variant, FIGS. 14a, b show schematic representations of the refrigerant flow path according to a second variant, FIGS. 15a, b show schematic representations of the refrigerant flow path according to a third variant, FIGS. 16a, b show schematic representations of the refrigerant flow path according to a fourth variant, FIGS. 17a, b show schematic representations of the refrigerant flow path according to a fifth variant, and FIGS. 18a, b show schematic representations of the refrigerant flow path according to a sixth variant.

Figure 19:
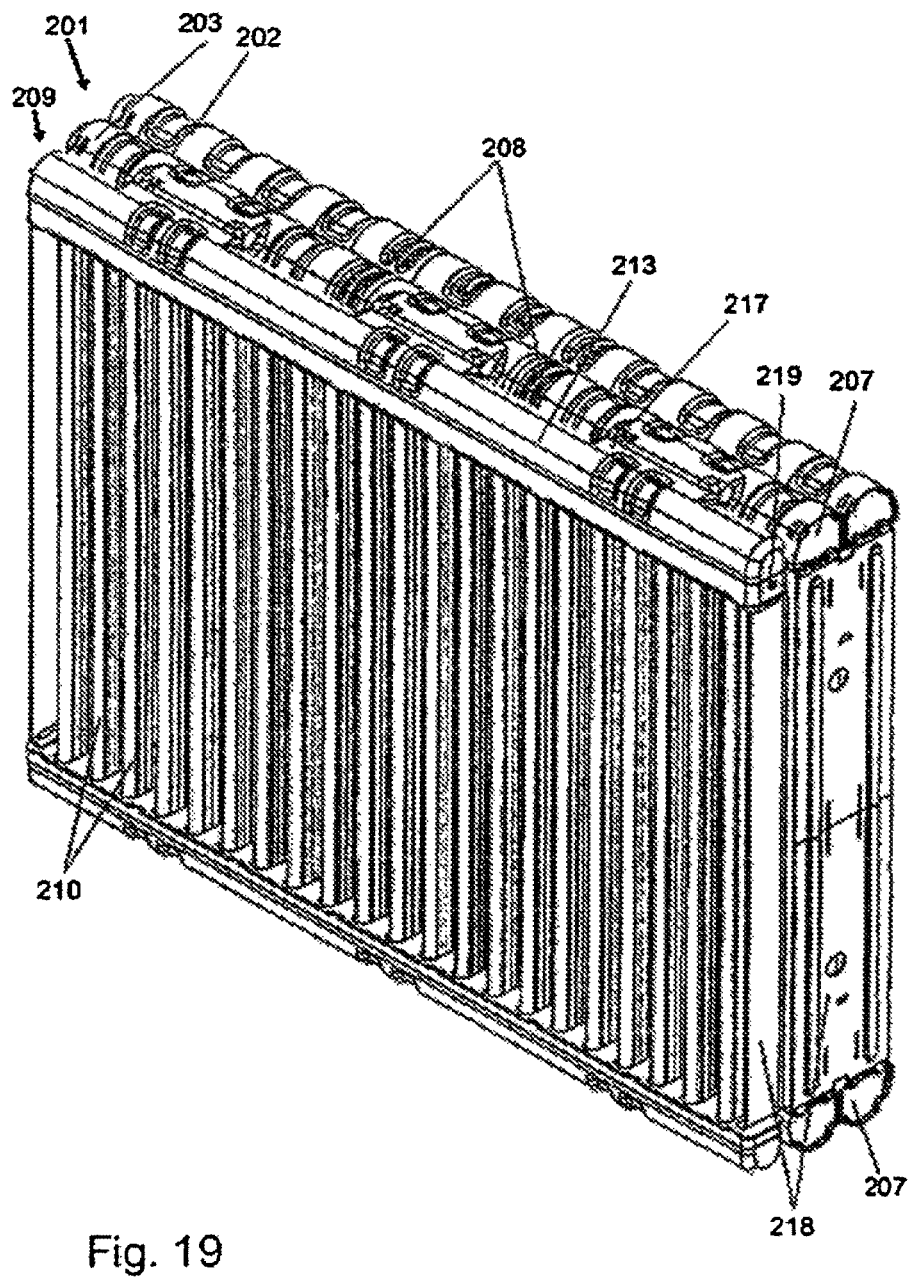
Figure 20:
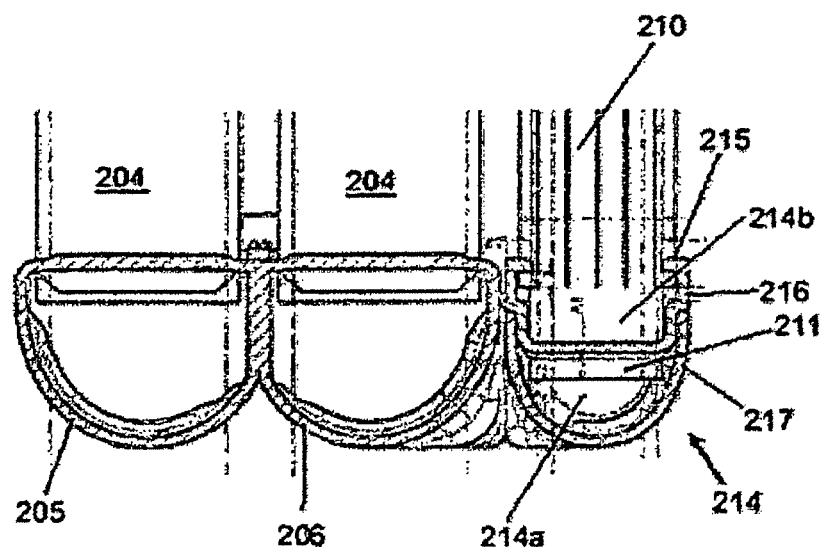
Figure 21:
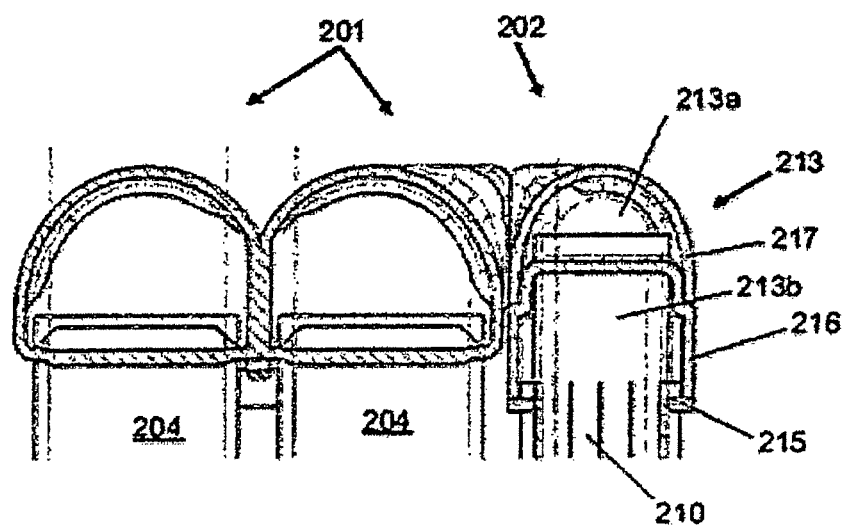
Figure 22:
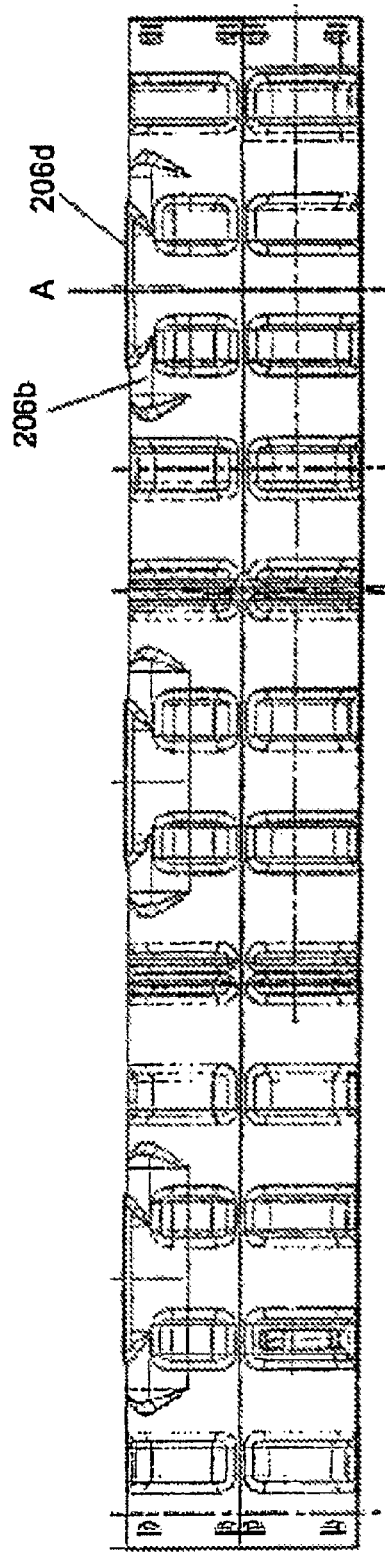
Figure 23:
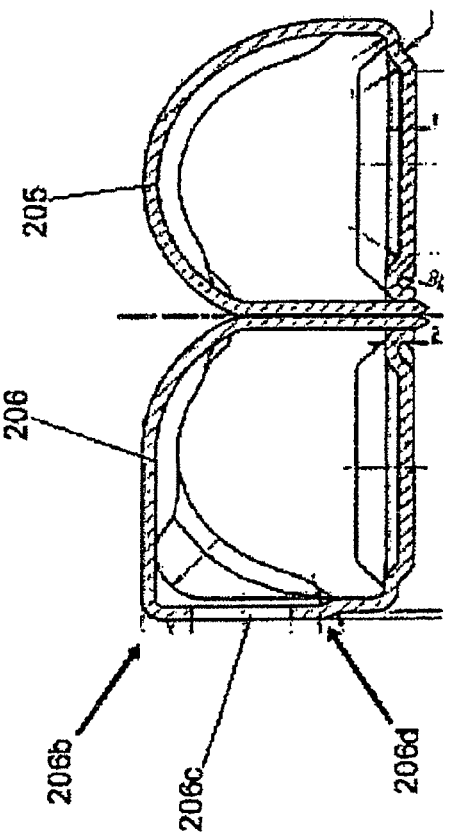
Figure 28:
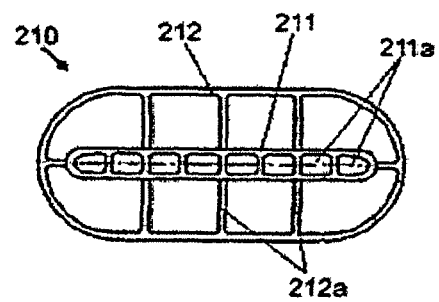
Figure 29:
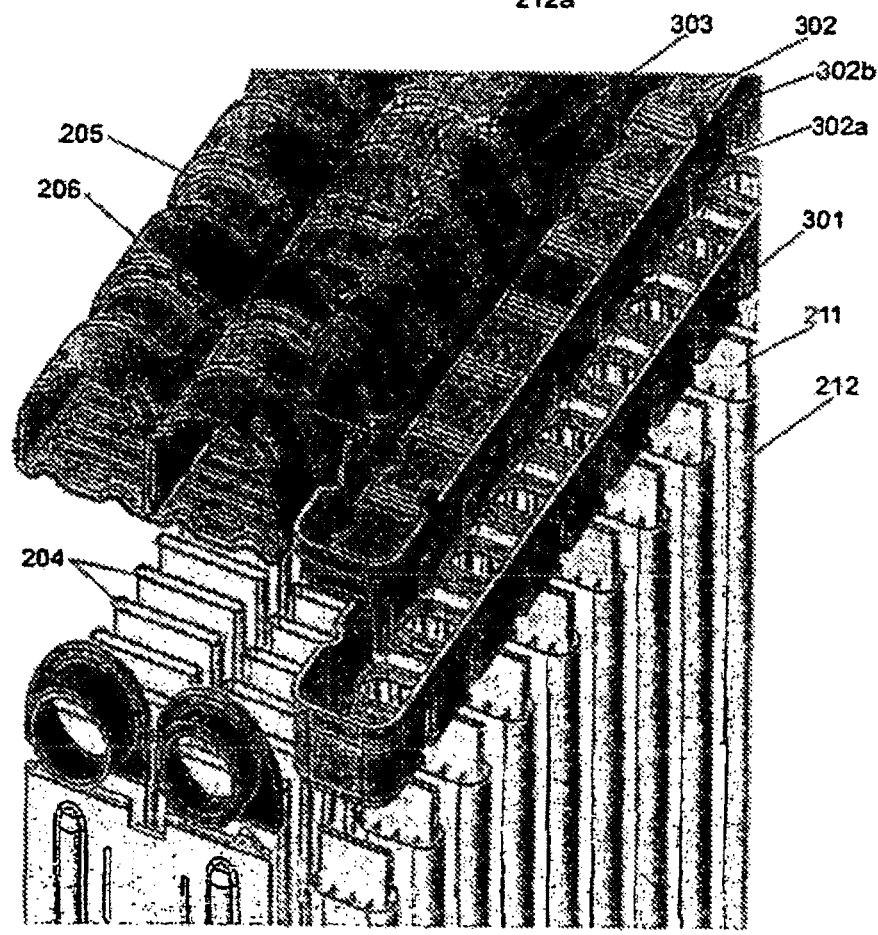
Figure 30:
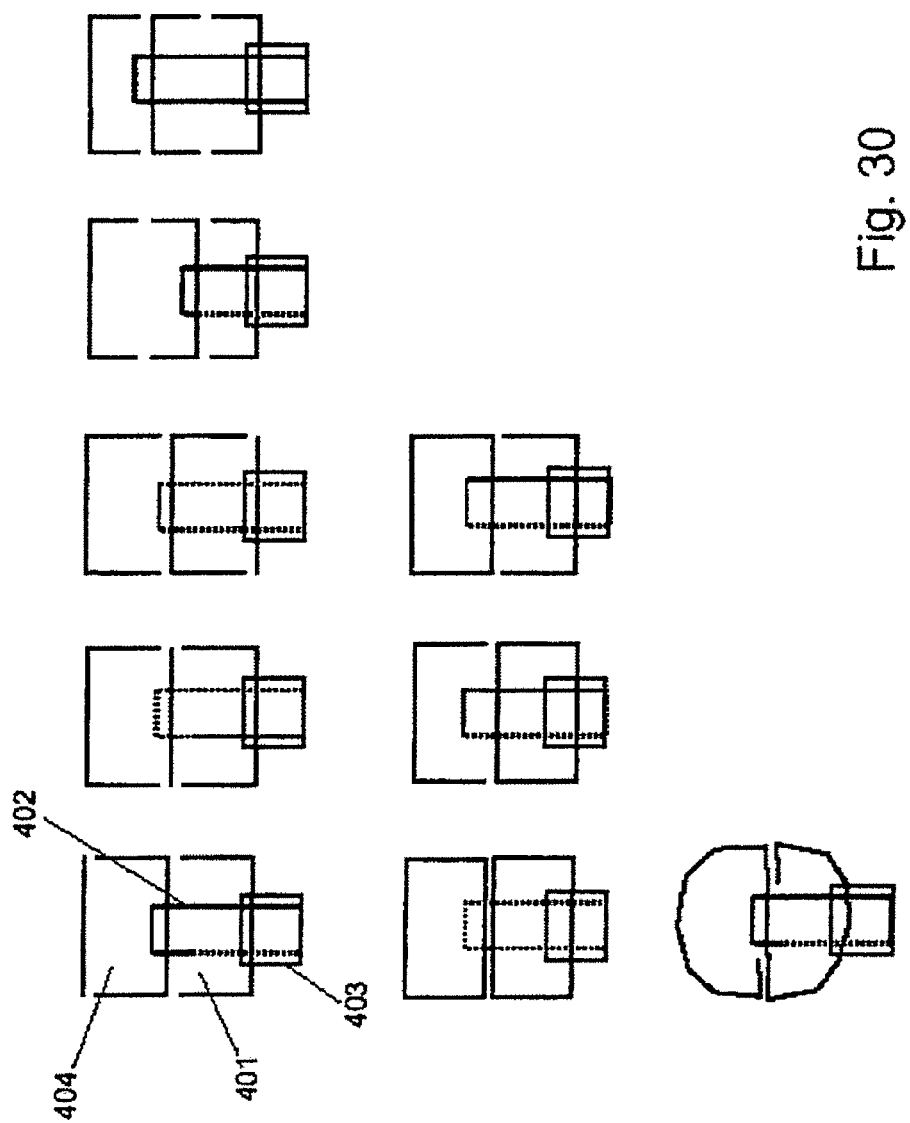

FIG. 19 shows a three-dimensional overall view of a second illustrative embodiment of a heat exchanger according to the invention, FIG. 20 shows a partial sectioned view of the heat exchanger from FIG. 19, FIG. 21 shows a further partial sectioned view of the heat exchanger from FIG. 19, FIG. 22 shows a plan view of cover parts of a first region of the heat exchanger from FIG. 19, FIG. 23 shows a sectioned view through the cover parts from FIG. 22 along the line A-A, FIG. 24 shows a plan view from the side of a cover part of a second region of the heat exchanger from FIG. 19, FIG. 25 shows a plan view from above of an intermediate part of the heat exchanger from FIG. 19, FIG. 26 shows a lateral plan view of the intermediate part from FIG. 25, FIG. 27 shows a plan view of a plate part of the heat exchanger from FIG. 19, FIG. 28 shows a sectioned view of a two-channel tube of the second region of the heat exchanger from FIG. 19, FIG. 29 shows a three-dimensional exploded view of a third illustrative embodiment of a heat exchanger according to the invention, FIG. 30 shows a schematic representation of a plurality of different basic designs of a heat exchanger according to the invention.

A motor vehicle air conditioning system for controlling the temperature of the motor vehicle interior having a refrigerant circuit (in the present case R134a, though $CO_2$ or another refrigerant, for example, may also be used) of which only the evaporator 1, with injection tube 2 and suction tube 3, is represented, has a cold store 4 in order to provide a sufficient cooling capacity at least for a short while even when the engine is stopped, which cold store consists of a plurality of cold storage elements 5, in the present case twenty-two, which are filled with a cold storage medium. The cold storage elements 5 are formed by regions of specially shaped, aluminum flat tubes 6, discussed in greater detail at a later point. Serving in the present case as the cold storage medium is decanol. Alternatively, tetra-, penta- or hexadecane, for example, are also suitable.

The normal air flow direction is indicated in FIGS. 1 and 2 by arrows. The evaporator 1 has in the larger part located on the leading edge a region 1' with structure corresponding to that of a conventional evaporator, having two rows of flat tubes 7 and corrugated ribs 8 disposed therebetween. The flat tubes 7 end respectively in a reservoir 9. As can be seen from FIGS. 1 and 2, the refrigerant enters on the narrow side of the upper reservoir 9 on the trailing edge into the evaporator 1 and leaves it on the same narrow side in the leading edge region of the reservoir 9.

The other region of the evaporator 1, namely the cold storage region 1", which, as a matter of principle, is configured separately as an independent region of the evaporator 1 and in which the cold storage elements 5 are provided, is formed by the smaller, trailing edge part of the evaporator 1.

As can be seen, in particular, from FIG. 8, the cold store flat tubes 6 in the cold storage region 1" and the conventional flat tubes 7 in the region 1' are arranged such that, in the case of the first, third, fifth, etc. flat tube 7, a cold store flat tube 6 is respectively arranged flushly in alignment with the same in the air flow direction.

Since the interspaces between the cold store flat tubes 6, which in the present case are configured in the air flow direction narrower, but transversely thereto wider than the flat tubes 7, are because of this arrangement relatively wide, the flow resistance for the air flowing through the evaporator 1 is virtually negligible in comparison to the flow resistance of the first region 1' of the evaporator 1 and can be substantially disregarded for the design of the evaporator 1 with regard to the air through-flow, so that, relative to a basic variant of the evaporator without the cold storage region 1", no or only minor recalculations have to be made with regard to the air flow. Alternatively, the flat tubes 6 and 7 can be arranged in any other chosen way, for example in alignment or staggered.

The cold store flat tubes 6 have a double-walled structure having a plurality of refrigerant channels 6' and cold storage medium channels 6", the refrigerant channels 6' being arranged on the inside (see FIG. 8). The cold store flat tubes 6 are here arranged such that the cold storage medium channels 6" serving as cold storage elements 5 respectively end in one of two cold storage medium reservoirs 10, so that the cold storage element 5 has only a single cavity, which—apart from a compensating space—is fully filled with the cold storage medium. The filling is realized in a single operation via an opening in the cold storage medium reservoir 10. After the filling, the opening is securely closed, so that unauthorized opening is reliably prevented.

According to a variant not represented in the drawing, inside the continuous cavity elements are provided, such as, in the present case, a synthetic non-woven, which serve to improve the heat transport and to increase the inner surface so as to accelerate the crystallization of the latent medium.

The refrigerant channels 6' project with their ends respectively through the corresponding cold storage medium reservoirs 10 and end respectively in a reservoir 12 configured separately from the reservoir 9, in the present case in the form of a tube, which reservoirs are hereinafter referred to as collecting tubes.

Each of the collecting tubes is connected by a respective slot-like overflow opening (not represented) to a slot-like overflow opening 13 of the reservoirs 9 disposed at a corresponding location (see FIG. 5).

The evaporator 1 is flowed through in its conventional region 1' in such a way that the refrigerant flow is deflected twice in the evaporator width, before being deflected depthwise counter to the air flow direction. In the leading edge region it is likewise deflected twice widthwise. The evaporator in question thus has six blocks B1 to B6, respectively three blocks being provided in the latitudinal direction of the evaporator 1 (i.e. in the row which is first flowed through, the blocks B1 to B3, and in the row which is last flowed through, the blocks B4 to B6) and the individual blocks B1 to B6 of the two block rows are flowed through in the cross-counterflow operation. This refrigerant flow path is represented in FIG. 10 by arrows shown with solid line.

Via the overflow opening 13 in the reservoir 9, shortly after the entry of the injection tube 2 into the reservoir 9 in the first block B1, a part of the refrigerant is branched off from the refrigerant flow, which refrigerant part makes its way via the overflow opening into the collecting tube and is distributed via the collecting tube over the refrigerant channels 6' of the flat tubes 6, which in the present case are flowed through in one direction, i.e. over the entire width of the evaporator 1 in the cold storage region 1" only one storage element block is present. The branched-off part of the refrigerant is fed via the second overflow opening provided on the second collecting tube, and the corresponding second overflow opening 13 on the other reservoir 9, back to the main refrigerant flow, which in this region of the block B3 is deflected depthwise to the block B4. The refrigerant flow path of the partial flow is represented in FIG. 10 by arrows shown with dashed line.

Instead of the previously described structure, the reservoirs can be constructed differently, in particular in panel construction.

In the other figures, different variants of the refrigerant conductance through the cold storage region 1" of the evaporator 1 is represented, which are designed to ensure that the cold storage medium in all cold storage medium channels 6" passes as evenly as possible through its phase change. For this it is necessary to ensure that the branched-off partial flow of the refrigerant is distributed as evenly as possible over the flat tubes 6 with their refrigerant channels 6'.

FIGS. 13a and 13b show a circuitry variant having 3-block circuitry in the storage element. The refrigerant from each of the first three blocks B1 to B3 of the conventional region 1' of the evaporator 1 is here distributed into the associated storage element block (i.e. there are three storage element blocks) and recirculated. As a result of the reduced number of parallel-connected flat tubes per storage element block, a better refrigerant distribution than the previously described illustrative embodiment is obtained.

According to one modification of this variant (not represented in the drawing), more than just one outlet and inlet opening per block of the conventional region of the evaporator are provided, so that, for example, six storage element blocks are provided.

According to the second variant represented in FIGS. 14a and 14b, the refrigerant flow is guided in the storage element in accordance with that in the serial evaporator (i.e. twofold deflection widthwise). In this circuitry, in the event of a one-off overflow from the conventional region 1' of the evaporator 1, only one-third of the flat tubes of the storage element is parallelly subjected to refrigerant. Other circuitries are likewise possible in the cold storage region 1", for example five storage element blocks may be provided.

FIGS. 15a and 15b show a direct refrigerant inlet into the refrigerant storage region 1" instead of into the conventional region 1' of the evaporator 1. With this variant, a preferred supply to the storage element block can be ensured should too little refrigerant be able to be drawn off from the conventional region 1' of the evaporator 1 through the passage openings.

Figure 16B:
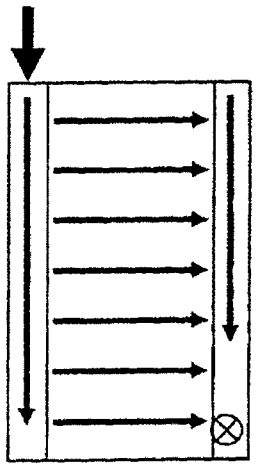

In FIGS. 16a and 16b, a split refrigerant inlet for the conventional region 1' of the evaporator 1 and the cold storage region 1" is provided as a fourth variant, i.e. the branching-off of the partial flow for the cold storage region 1" is realized still prior to the entry of the refrigerant into the evaporator 1 in the region of the injection tube. In this case, the refrigerant distribution over the two inlet openings can be optimized, where appropriate, via the injection tube diameter and the pressure loss in the conventional region 1' of the evaporator 1 and in the cold storage region 1".

Figure 17B:
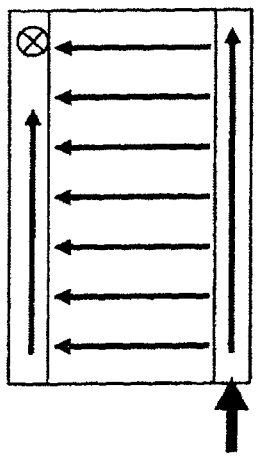

FIGS. 17a and 17b show a circuitry variant having a serial connection of the cold storage region 1" and, downstream, of the conventional region 1' of the evaporator 1. In this variant, the cold storage medium in the cold storage region 1" is first frozen by means of the refrigerant flow (in the present case, the entry is made from below), before the refrigerant then in the normal flow guidance passes through the conventional region 1' of the evaporator 1. Since the whole of the refrigerant flow is conducted fully through the cold storage region 1", this variant freezes the cold storage medium fastest.

Figure 18B:
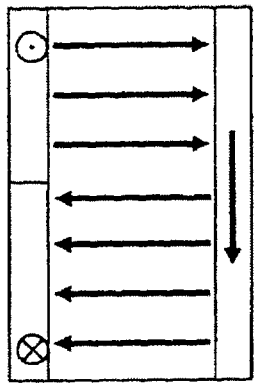

In FIGS. 18a and 18b, a further circuitry variant is represented, according to which, once again, a partial flow is branched off in the first block B1. In the present case, the cold storage region 1" here has two blocks, which are flowed through in different directions. The refrigerant from the cold storage region 1" here enters into the reservoir of the third block B3 and flows jointly through the same, i.e. the third block B3 is flowed through by the whole of the refrigerant, while the first two blocks B5 and B2 are only flowed through by a (larger) refrigerant partial flow. According to the represented variant, the two blocks of the cold storage region 1" have a different width, the block which is first flowed through being narrower than the block which is subsequently flowed through.

The circuitry variants allow improved dynamics of the loading and unloading operation to be optimized and the outlet temperature profile of the evaporator when the vehicle is stopped to be homogenized.

All variants are independent of the refrigerant (R134a, R744), of the collector design (curved collector, panel construction) and block circuitry of the serial evaporator (for example, 2- or 4-block circuitry).

A second illustrative embodiment according to the invention is represented in FIG. 19. With regard to the fluid paths, said heat exchanger functions in the same way as that shown in FIG. 1, with the fluid paths running as per the illustrations in FIG. 11 and FIG. 12.

A first region 201 comprises an evaporator, which is known in principle, having two evaporator planes 202, 203 which are arranged in series in the through-flow direction of the air. A plurality of parallel refrigerant tubes 204 extend in the vertical direction in each of the planes, which refrigerant tubes 204 are each formed as extruded profiles with a plurality of separate chambers. At the end side, the tubes 204 open out in each case into upper or lower reservoirs 205, 206 of the respective plane.

The reservoirs are formed as sheet-metal molded parts. Here, openings for inserting the tubes 204 are punched out of an aluminum sheet, rounded formations are formed by deep-drawing and a part of the metal sheet is bent in order to produce a closed box (see in particular FIG. 23). In this way, end sides of the reservoir 205, 206 initially remain open and are closed off by means of closure caps 207 during the course of further production. The closure caps expediently serve to supply the refrigerant lines of an air conditioning system to the evaporator (represented only in the first and third illustrative embodiments).

Furthermore, in each case two grooves 208 are formed in the sheet-metal molded parts of the reservoir, into which grooves 208 can be inserted separators for separating the different blocks of the evaporator. In this way, one sub-group of the tubes 204 is connected only to in each case one separate section of the respective reservoir 205, 206.

Arranged on one side of the two-layered evaporator 201, or of the first region of the heat exchanger, is the second region 209 as a cold store with evaporator function. As in the first illustrative embodiment, said part of the heat exchanger likewise comprises a plurality of parallel tubes 210 which, in contrast to the tubes 204 of the first region 201, comprise a first channel 211 and a second channel 212 (see the cross-sectional representation in FIG. 28). The first channel 211 is an extruded flat tube with a plurality of chambers 211a and conducts the refrigerant on its flow paths as per FIG. 12. The second channel 212 is formed as an extruded profile with two straight, relatively long side surfaces and two curved, relatively short end surfaces, as a result of which the air which flows around the second channel is conducted in a favorable manner. Situated in the second channel is the cold storage medium, as described in the first illustrative embodiment.

The flat tube 211 of the first channel is inserted into the profile of the second channel. Here, the second channel 212 has, in cross section, a number of struts 212a which extend from the outer wall of the second channel 212 to the wall of the inserted first channel 211. In addition to separating the second channel 212 into a plurality of chambers and improving the heat transfer, the struts 212a also perform the function of radially guiding or retaining the inserted first channel. Depending on the dimensions and tolerances provided, the guidance may be tight or loose. It is also conceivable for the first and the second channels to be soldered to one another via the struts 212a, for example by virtue of the outer surface of the first channel tube 212 being solder-plated.

The tubes 210 of the second region 209 open out at the end side in an upper collector region 213 and a lower collector region 214. Each of the collector regions 213, 214 comprises in each case one first reservoir 213a, 214a and, directly adjoining the latter, a second reservoir 213b, 214b. Proceeding from the first reservoirs 213a, 214a, the refrigerant is distributed between or collected from the inner tubes 211. In contrast, the second reservoirs 213b, 214b are in exchange in each case with the outer tubes 212 and accordingly conduct the cold storage medium.

In a similar manner to the first illustrative embodiment, in this construction, the inner channels 211 of the tubes 210 project at the end side beyond the outer channels 212 and extend entirely through the second reservoir 213b, 214b, with said inner channels 211 being soldered in a sealing fashion to the passage openings of the reservoirs. In contrast, the outer tubes 212 open out in each case into the second reservoirs 213b, 214b. The height of the second reservoirs is preferably 5 to 25 mm, preferably 8 to 20 mm—in particular depending on the installation position or the filling quantity of cold storage medium.

The collector regions 213, 214 are constructed in each case from three sheet-metal molded parts, namely a plate part 215, an intermediate part 216 and a cover part 217. As shown by the sectioned drawings of FIG. 20 (lower collector region 214) and FIG. 21 (upper collector region 213), the molded parts 215, 216, 217 are not identical but rather are of similar shape. In particular, in the case of the upper collector region 213, the intermediate part 216 has a slightly greater height than the intermediate part 216 of the lower collector region 214. In this way, a greater collecting volume for the cold storage medium is provided in the upper collector region 213. This results, since a uniform upper end plane of the regions is predefined for installation space reasons, in a projection beyond the upper collector of the first region 201 which adjoins in the depthwise direction (see FIG. 21). Said slight projection in relation to the free length of the tubes 204 adversely affects the flow of air through the heat exchanger only to an insignificant extent, such that the advantages of the relatively large collector volume prevail. In the case of the lower collector regions, it is desirable for the collectors of the first and second regions to end at the same height, in order to permit an outflow of condensed water on the side of the second region too (see in particular FIG. 20).

The sheet-metal molded part 215 of the plate part is produced as a punched part from a planar metal sheet (see FIG. 27). Said sheet-metal molded part 215 has a plurality of indentations 215a for form-fitting positioning during assembly, into which indentations 215a engage corresponding teeth 216a of the intermediate part 216. Furthermore, a punched-out portion 215b is provided for each of the tubes 210, which punched-out portions 215b correspond, within the context of precisely defined dimensional tolerances, to the outer periphery of the second channels 212 of the tubes 210.

The sheet-metal molded part 216 of the intermediate part is produced as a deep-drawn part. Its outline corresponds, as per the shape of the collector regions 213, 214, to a rectangle with a pronounced side ratio of approximately 18:1. As a result of the deep-drawing process, a fully-encircling edge 216b is turned up, such that the molded part 216 is trough-shaped overall. Provided in the bordered surface of the molded part are apertures 216c which correspond to the outer periphery of the inner channels 211 of the tubes 210.

The sheet-metal molded part or cover part 217 is likewise formed as a trough-shaped deep-drawn part. Its fully-encircling edge engages partially over the intermediate part 216 in the assembled and soldered state, with the edges of the cover part 217 and of the intermediate part 217 pointing in the same direction in each case.

A cavity between the cover part 217 and the intermediate part 216 forms the first reservoir 213. A cavity between the intermediate part 216 and the plate part 215 forms the second reservoir 214. The intermediate part 216 therefore serves to separate in each case the first reservoir 213 from the second reservoir 214. It is thereby possible overall to form the two adjacent reservoirs completely and using a simple production process by means of the three sheet-metal molded parts, wherein additional end-side closure covers, such as for example in the case of the collector of the first region 201, are in particular not necessary.

The cover part 217 has a substantially U-shaped cross section over the major part of its length (see for example FIG. 20, FIG. 21). A jutty-like projection 217a is formed laterally at three positions in each case during the course of the deep-drawing process. Said jutty-like formation has a planar, vertically aligned section which is situated opposite, and so as to areally adjoin, a corresponding section 206b of a similar jutty 206a of the collector 206 of the first region 201. Said sections 206b, 217b are areally soldered to one another in the assembled state, so as to provide mechanically secure retention of the second region on the first region. A total of six such connections is provided; three on the upper side of the heat exchanger and three on the underside of the heat exchanger.

Two of the sections also have in each case overlapping apertures 217c, 206c, such that in each case one overflow opening is formed between the first region and the second region. Expedient dimensions for the overflow openings are a width of 5 to 40 mm, in particular 20 to 30 mm, and a height of 2 to 20 mm, in particular 5 to 10 mm.

In the interests of a low defect rate during soldering, the planar sections 206b, 207b also have drawn-out connecting surfaces (see for example 206d in FIG. 23) which project beyond the planar sections typically by less than one millimeter. Such connecting surfaces expediently form borders around the apertures.

The heat exchanger also comprises, as per FIG. 19, lateral closure plates 218 which facilitate assembly of the heat exchanger and improve the guidance of the air to be cooled. The closure plates 218 are not essential components.

A filling opening 219 is formed in the end side of the upper intermediate part 216 and is either closed off after a filling process with cold storage medium or is connected to an equalizing tank. The filling opening can be closed off using conventional methods, such as for example by means of adhesive bonding, riveting, welding, soldering, form-fitting or frictionally engaging connections or a combination of these.

The heat exchanger of the third illustrative embodiment as per FIG. 29 is of similar construction to the second illustrative embodiment. The first region and the tubes of the second region are of identical design, for which reason the same reference symbols as in the second illustrative embodiment are used here.

The collector regions of the second region are likewise composed of three sheet-metal molded parts, namely a plate part 301, an intermediate part 302 and a cover part 303. Here, all of the three parts are formed as trough-shaped deep-drawn parts. The plate part 301 engages with its edge over a part of the outer wall of the intermediate part 302, the turned-up edge 302a of which is aligned the opposite way round to the second illustrative embodiment. A number of resilient or flexible lugs 302b are provided on the edge 302a, by means of which lugs 302b the placed-on cover part 303 is held in a clamped fashion during the course of pre-assembly.

The illustration of FIG. 30 schematically represents some basic concepts by which a collector region having two reservoirs can be constructed from simple sheet-metal molded parts. Here, a first tube 402 extends through in each case one lower reservoir 401, with a second tube 403 opening out into said lower reservoir 401. The first tube 402 opens out into a directly adjacent upper reservoir 404 which is separated from the lower reservoir 401 only by means of a molded sheet-metal wall.

In the case of the five illustrations on the upper row, in each case three sheet-metal molded parts are connected to one another, with some of the sheet-metal molded parts being provided with turned-up edges (deep-drawn parts or angled metal sheets) or else are flat metal sheets (simple punched parts). The middle illustration of the upper row schematically corresponds to the second illustrative embodiment, and the fourth illustration from the left corresponds to the third illustrative embodiment.

The three examples of the middle row show solutions with only two sheet-metal molded parts.

The lower example shows a solution in which the two reservoirs are formed from only one sheet-metal part which is curved in an S-shape.

It is self-evident that the individual features of the different illustrative embodiments may be meaningfully combined with one another according to the requirements.

It is also conceivable for the refrigerant to flow through the heat exchanger in the opposite direction to that described above in the stated illustrative embodiment. Since the pressure falls in the direction of the suction line and therefore the evaporation temperature of the refrigerant falls, this can if appropriate result in improved cooling dynamics of the storage evaporator, in particular of the latent medium.

The invention claimed is:

1. A heat exchanger for a motor vehicle air conditioning system comprising:
    a first region comprising first and second rows, each of the first and second rows including a first plurality of mutually adjacent, refrigerant-carrying tubes;
    a second region, placed downstream of the first region in a direction of air flowing through the heat exchanger, and comprising a third row distinct from the first and second rows, the third row including a second plurality of mutually adjacent, refrigerant-carrying tubes and at least one cold store configured to be provided with a cold storage medium; wherein the cold store is not in the first region; and
    at least one overflow opening configured to connect the first region and the second region,
    wherein the first region and the second region are mutually parallel,
    wherein the first and second rows of tubes are arranged one behind the other in the direction of air flowing through the heat exchanger, and the second and third rows of tubes are arranged one behind the other in the direction of air flow through the heat exchanger,
    wherein the cold store is disposed such that at least a part of a refrigerant flow can flow through the cold store,
    wherein at least part of the refrigerant flow can flow through the first region, and
    wherein at least one first reservoir for a refrigerant and at least one second reservoir for the cold storage medium are formed substantially from three sheet-metal molded parts, comprising a base part, an intermediate part and a cover part.

2. The heat exchanger according to claim 1, wherein the first and second regions extend over an entire width of the heat exchanger in a direction perpendicular to the direction of air flowing through the heat exchanger.

3. The heat exchanger according to claim 1, wherein the at least one overflow opening comprises six overflow openings.

4. The heat exchanger according to claim 1, wherein at least one refrigerant-carrying tube from the second plurality of mutually, adjacent refrigerant-carrying tubes is arranged within the at least one cold store.

5. The heat exchanger according to claim 1, wherein at least one refrigerant-carrying tube from the second plurality of mutually adjacent, refrigerant-carrying tubes is a double-walled flat tube, the refrigerant being located in a central region of the double-walled flat tube and the cold storage medium being located in an outer region of the double-walled flat tube.

6. The heat exchanger according to claim 1, wherein the second plurality of refrigerant-carrying tubes or cold storage channels configured to carry the cold storage medium end in the second reservoir, through which the second plurality of refrigerant-carrying tubes or the cold storage medium channels project.

7. The heat exchanger according to claim 1, wherein a phase change temperature of the cold storage medium lies within a range from 0° C. to 30° C.

8. The heat exchanger according to claim 1, wherein within the cold store there is disposed at least one insert.

9. The heat exchanger according to claim 1, wherein at least one of the three sheet-metal molded parts is formed as a substantially trough-shaped part with an encircling edge which is turned up in a region of an end side.

10. The heat exchanger according to claim 1, wherein at least one of the three sheet-metal molded parts is formed as a deep-drawn part.

11. The heat exchanger according to claim 1, wherein at least one of the three sheet-metal molded parts has a lug for a clamped retention of one of the other sheet-metal molded parts.

12. The heat exchanger according to claim 1, wherein an upper plate plane of a lower reservoir of the second region and an upper plate plane of a lower reservoir of the first region run at substantially a same height.

13. The heat exchanger according to claim 1, wherein a structural height of a collector region of the second region is greater than a structural height of an adjacent reservoir of the first region.

14. The heat exchanger according to claim 1, wherein the first region has, in a first direction of its width adjacent to the second region, a number of blocks through which the refrigerant can flow through in a second direction different from the first direction, and wherein the second region has at least one block through which the refrigerant can flow in the second direction.

15. The heat exchanger according to claim 14, wherein the first region has directly adjacent to the second region two to four blocks, and the second region has one to six blocks.

16. An air conditioning system with a cold store for a motor vehicle comprising a refrigerant circuit having a heat exchanger according to claim 1.

17. The heat exchanger according to claim 1, wherein a collector region of the second region has at least one substantially planar section which is soldered areally to a corresponding substantially planar section of a collector region of the first region.

18. The heat exchanger according to claim 17, wherein the planar sections which are soldered to one another have an aperture to form the overflow opening.

19. The heat exchanger according to claim 1, wherein the second plurality of refrigerant-carrying tubes end in a third reservoir, which is configured to be separate from the first reservoir of the first region by the at least one overflow opening.

20. The heat exchanger according to claim 19, wherein, in the second region, an upper collector region and a lower collector region are provided with the second reservoir for the cold storage medium and the third reservoir, wherein the upper collector region and the lower collector region are connected by a plurality of tubes, with at least one of the tubes having at least one first channel configured to conduct the refrigerant and at least one second channel, which is separated by a partition, configured to conduct the cold storage medium.

21. The heat exchanger according to claim 20, wherein one of the first and second channels projects at an end side beyond the other of the first and second channels, with the projecting channel extending entirely through one of the second reservoirs.

22. The heat exchanger according to claim 20, wherein at least one of the first and second channels has a plurality of separate chambers.

23. The heat exchanger according to claim 20, wherein one of the first and second channels is formed as an outer tube and the other one of the first and second channels is formed as an inner tube which is inserted into the outer tube.

24. The heat exchanger according to claim 23, wherein at least one of the outer tube and the inner tube is configured to radially guide the other of the outer tube and the inner tube.

25. The heat exchanger according to claim 23, wherein the inner tube is the first channel configured to conduct the refrigerant and the outer tube is the second channel configured to conduct the cold storage medium.

26. The heat exchanger according to claim 23, wherein at least one of the first and second channels is formed as an extruded profile.

* * * * *